No. 753,325. Patented March 1, 1904.

UNITED STATES PATENT OFFICE.

ALBERT W. SMITH, OF CLEVELAND, OHIO.

PROCESS OF MAKING CHLOROFORM.

SPECIFICATION forming part of Letters Patent No. 753,325, dated March 1, 1904.

Application filed October 9, 1902. Serial No. 126,451. (No specimens.)

*To all whom it may concern:*

Be it known that I, ALBERT W. SMITH, a citizen of the United States, and a resident of Cleveland, county of Cuyahoga, and State of Ohio, have invented a new and useful Improvement in Processes of Manufacturing Chloroform, of which the following is a specification, the principle of the invention being herein explained and the best mode in which I have contemplated applying that principle, so as to distinguish it from other inventions.

My improved process relates to the manufacture of chloroform, its object being to produce the same in a manner more economical than those of the processes of production generally used at present and at the same time to produce a product purer than that produced by the present commercial process from acetone and chlorid of lime in that it contains no dangerous and poisonous oxygen compounds, from which the latter must be carefully freed.

Said invention consists of certain steps hereinafter fully described, and specifically set forth in the claims, such description setting forth in detail one mode of carrying out the invention and such disclosed mode constituting but one of various ways in which the principle of the invention may be used.

My improved process consists in the production of chloroform by the following steps, including the action of heated sulfur upon heated carbon, so as to produce carbon bisulfid, the action of chlorin upon sulfur, so as to produce sulfur chlorid or dichlorid, the action of sulfur chlorid or dichlorid upon carbon bisulfid, so as to produce carbon tetrachlorid, and, finally, the reduction of the carbon tetrachlorid, so as to produce chloroform.

The carbon bisulfid may be produced by any of the well-known methods, such as by heating charcoal with sulfur in iron retorts or by passing sulfur-vapor into a properly-arranged retort filled with charcoal and heated internally by an electric current and subsequently purifying the carbon bisulfied.

The sulfur chlorid is best prepared by passing chlorin into a solution of sulfur in sulfur chlorid and adding more sulfur as that present becomes converted into chlorid. Either sulfur monochlorid or dichlorid may be used, preferably the latter. The conversion of these two compounds to the carbon tetrachlorid is accomplished by mixing with the sulfur chlorid in a retort somewhat less than the requisite quantity of carbon bisulfid to effect its conversion, adding a small quantity of aluminium, of finely-divided iron, or of anhydrous iron or aluminium chlorid, and, finally, boiling with a fractioner until the reaction is practically completed.

For example, to eight hundred pounds of sulfur chlorid ($SCl_2$) in a retort are added six pounds of finely-divided iron and then slowly two hundred and fifty pounds of carbon disulfid. During the addition of the first fifty pounds of bisulfid the temperature is not allowed to exceed 60° centigrade. When sufficient carbon bisulfid has been added to convert all of the sulfur dichlorid to the monochlorid, ($SCl_2$ to $S_2Cl_2$,) distillation is begun, with a fractioner arranged to return the sulfur monochlorid to the retort, at the same time the addition of the carbon bisulfid being continued until the two hundred and fifty pounds are added. By this time most of the carbon tetrachlorid, with a little sulfur chlorid and carbon bisulfid, has been distilled and is ready for further purification. The residue in the retort, consisting mainly of sulfur dissolved in sulfur monochlorid, is cooled to remove the greater part of the free sulfur, which is then separated and is made available for the production of more carbon bisulfid and sulfur chlorid, and thus acts over and over again as a carrier of the carbon and chlorin to each other. It is thus seen that the carbon tetrachlorid is made from the elements chlorin and carbon, the cheapest possible raw material for the production of chloroform. The carbon tetrachlorid so produced is first purified from the small quantity of carbon bisulfid that it contains by boiling it with a small quantity of sulfur monochlorid for two hours and from the sulfur chlorid by similar boiling with sulfur, which converts any sulfur chlorid to the monochlorid. From this the tetrachlorid is readily separated by fractional distillation, yielding practically pure tetrachlorid. Instead of using sulfur chlorid for making carbon tetrachlorid sulfur monochlorid, or a solution of sulfur in carbon bisulfid and chlorin, may be used. The purified carbon tetrachlorid is then reduced to chloroform by the substitution of one atom of hydrogen for one atom of chlorin in the molecule of tetrachlorid. This may be accomplished in a number of ways, as by treating the tetrachlorid with some substance or substances that will generate nascent hydrogen, such as an acid and a metal or an alkali and zinc or by electrolytic methods. This reaction may be much shortened in time by bringing the tetrachlorid and acid used in the production of nascent hydrogen into more intimate contact with each other by the use of a mutual solvent for both tetrachlorid and acid. Ethyl or methyl alcohol answers such purpose. I have found, however, that mechanical agitation of the tetrachlorid with the reducing substances answers the same purpose to a certain extent and is preferable, because it eliminates the necessity of separating the chloroform from the mutual solvent, which in practice presents considerable difficulties. I have also found that simple agitation of the tetrachlorid with water and finely-divided iron without any acid or simply a trace of acid to start the reaction is one of the most efficient methods of reduction of the tetrachlorid to chloroform. This method is far cheaper than that involving the use of acids or most other reduction methods and possesses the added advantage that it can be readily controlled, so that little or no reduction to dichlormethane takes place. The temperature during this reaction must be carefully controlled, as if it is allowed to rise the reaction becomes so vigorous that the product is completely destroyed by overreduction. For the same reason it is preferable to add the iron in successive small portions, so that no large excess of iron is at any time present.

One method of procedure is as follows: Five hundred pounds of carbon tetrachlorid are placed in an iron cylinder, the latter mounted on an axle, so that it can be rotated, and provided with a hollow jacket, through which water can be run, so as to accurately control the temperature of the contents of the retort. To the contents are now added about a half-pound of hydrocholric acid and four hundred pounds of water and the retort rotated, while at frequent intervals powdered iron is added in small quantities, about a pound at a time, until four hundred pounds have been added. The agitation is continued until reduction is nearly complete for from forty to seventy hours in all, the temperature being kept at about 15° centigrade. The iron is oxidized by the oxygen of the water and the chlorin of the tetrachlorid to an oxychlorid of iron, and a part of the hydrogen of the water replaces a part of the chlorin of the tetrachlorid to produce chloroform, which is then separated from the other products by steam and fractionally distilled to separate it from any unreduced tetrachlorid and other products.

I therefore particularly point out and distinctly claim as my invention—

1. The process of manufacturing chloroform which consists in forming carbon disulfid by the action of heated sulfur upon heated carbon, forming carbon tetrachlorid by the action of sulfur chlorid upon such disulfid, and then treating such tetrachlorid with a metal and a substance containing hydrogen.

2. The process of manufacturing chloroform which consists in forming carbon disulfid by the action of heated sulfur upon heated carbon, forming carbon tetrachlorid by the action of sulfur chlorid upon such disulfid, and then subjecting such tetrachlorid to the action of water and a metal.

3. The process of manufacturing chloroform which consists in forming carbon disulfid by the action of heated sulfur upon heated carbon, forming carbon tetrachlorid by the action of sulfur chlorid upon such disulfid, and then subjecting such tetrachlorid to the action of water and iron.

4. The process of manufacturing chloroform which consists in agitating water, carbon tetrachlorid and a metal in a suitable receptacle.

5. The process of manufacturing chloroform which consists in agitating water, carbon tetrachlorid, and iron in a suitable receptacle.

6. The process of manufacturing chloroform, which consists in heating carbon tetrachlorid containing carbon disulfid with sulfur and sulfur chlorid, fractionally distilling the product to produce pure carbon tetrachlorid and subjecting the resulting product to the action of a metal and substance containing hydrogen.

7. The process of manufacturing chloroform, which consists in heating carbon tetrachlorid containing carbon disulfid with sulfur and sulfur chlorid, fractionally distilling the product to produce pure carbon tetrachlorid and subjecting the resulting product to the action of a metal and water.

8. The steps in the manufacture of chloroform which consist, in treating heated sulfur with heated carbon, treating the carbon disulfid thus formed with sulfur chlorid with the production of carbon tetrachlorid, purifying the tetrachlorid by heating with sulfur and sulfur chloid, and fractionally distilling, and then subjecting it to the action of water and a metal.

Signed by me this 7th day of October, 1902.

ALBERT W. SMITH.

Attest:
 GEO. W. SAYWELL,
 A. E. MERKEL.